Oct. 7, 1969    J. F. MUELLER    3,470,773
DIE TECHNIQUES
Filed Sept. 30, 1966

INVENTOR.
JOSEPH F. MUELLER
BY
*Wolf, Greenfield & Hieken*
ATTORNEYS

United States Patent Office 3,470,773
Patented Oct. 7, 1969

3,470,773
DIE TECHNIQUES
Joseph F. Mueller, Dedham, Mass.
(490 Centre St., Quincy, Mass. 02169)
Filed Sept. 30, 1966, Ser. No. 583,215
Int. Cl. B21k *5/20;* B31b *1/14*
U.S. Cl. 76—107                                                             2 Claims

ABSTRACT OF THE DISCLOSURE

A pair of mirror-matched dies include opposed scores facing each other but separated by a small distance less than the thickness of material passed between the dies when the dies are urged together for producing face scores on both sides of the material and opposed knife edges for cutting the material with each of the knife edges cutting half the thickness at a point upon which the knife edges intersect. The dies may be curved for attachment to a respective drum of a cylindrical press and made as follows. First the image desired to be impressed may be photographically or otherwise transferred upon a brass plate. Then conventional cutting techniques, such as chemical etching or routing, may be employed to produce the image in relief on the brass plate. A mat of the image in relief on this brass plate may then be made in the same manner practiced in making newspaper plates. This mat may then be curved to present a concave contour of the relief impression of the engraved flat plate essentially along a surface having a radius of curvature corresponding to that which the finished die is desired to have when affixed to the drum of a cyclindrical press, this radius typically being 6.5 inches. A sheet of moldable plastic material may then be placed over the curved mat and sufficient heat and pressure applied to cause the sheet to assume the shape of the curved image in relief. The assembly may then be allowed to cool, thereby producing one of the mirror-matched dies. The process may be repeated to produce the other, but the mirror image of the image photographically or otherwise transferred upon the first-mentioned brass plate is transferred to a second brass plate.

---

The present invention relates in general to dies and methods of their manufacture and more particularly relates to cutting and scoring dies that are mirror-matched on opposing cylinder surfaces. Dies according to the invention are suitable for use in relatively high speed cylinder presses and capable of simultaneously cutting, creasing and embossing material to produce an unfolded flat carton which may be shipped flat and rapidly assembled at the destination for attractively packaging products.

According to one aspect of the invention there are two mirror matched dies. The mirror matched dies may include opposed knife edges arranged for cutting half the thickness of any given material passed between them when urged together. The dies may alternately or also include two scores facing each other but separated by a small distance when the dies are urged together to produce face scores on both sides of the stock between them so that a fold may be produced in either direction without distortion. Alternately or also the two mirror matched dies may be curved and have designs with the design register corrected.

According to the method for making curved dies according to the invention the process converts from flat to curved segments without loss of register by suitable radial reduction and radial enlargement techniques. This process may include the following steps. An image of the desired end product is transferred to suitable material, typically by employing known photographic techniques. This material is then cut by known techniques, such as routing or etching to form the image in relief on the material. The cutting may leave one or more raised knife edges in a knife edge plane and one or more crease edges in a crease edge plane that is below the knife edge plane, this cutting in a flat plane producing a flat projection in relief of the image. From this flat projection in relief a master mat is produced by conventional techniques. This master mat is then formed into a concave contour corresponding to the diameter of the finished product. While this mat is thus formed, Fiberglas or other suitable plastic material is brought in contact with the master mat, typically at temperatures and under pressure high enough so that the Fiberglas or other plastic material is soft enough to take the form of the image in relief on the master mat. Upon hardening of the plastic material and removal of the master mat, there is a Fiberglas or other plastic die in a curved surface corresponding to the radius of the drum of a cylindrical press to which the die thus formed may be secured. The steps just described are repeated except that the image applied to the suitable material upon repetition of the steps is the mirror image applied to the suitable material early in the progression of steps immediately described above. The resultant process thus produces a pair of mirror matched curved dies suitable for attachment to opposed cylinders of a cylindrical press to permit exceptionally high speed cutting, creasing and embossing of suitable stock fed into the press.

It is an important object of this invention to provide improved matched dies suitable for use on cylindrical presses and substantially free of optical distortion.

It is another object of the invention to provide matched dies suitable for scoring stock on both sides to permit folding in either direction without distortion.

It is a further object of the invention to provide matched dies in accordance with the preceding object capable of cutting any given material passed between them with each knife edge of the die cutting substantially half the material passing between them.

It is a further object of the invention to provide improved methods for making dies that achieve one or more of the preceding objects.

It is a more specific object of the invention to provide a method for making curved dies of Fiberglas or other plastic material suitable for use on cylindrical presses and substantially free of optical distortion.

Numerous other features, objects and advantages of the invention will become apparent from the following specification when read in connection with the accompanying drawing in which.

Figure 1:
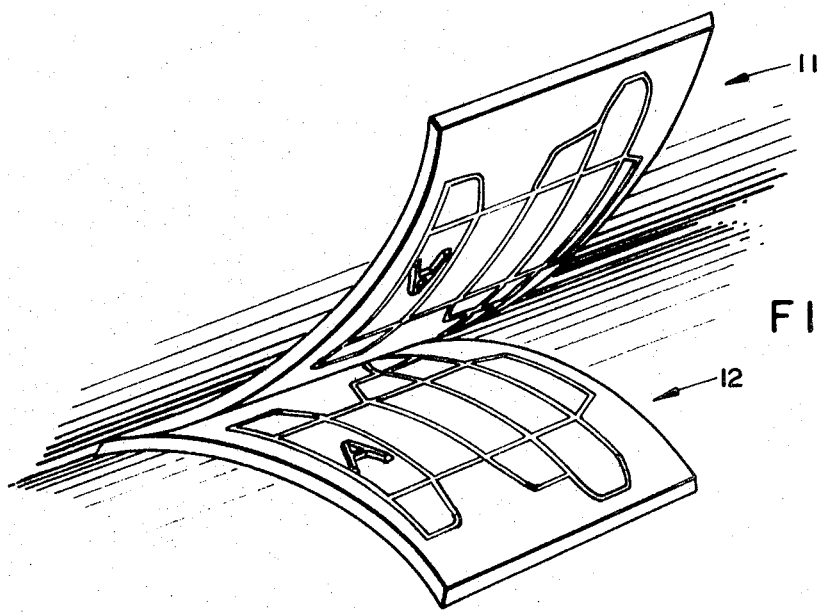
FIG. 1 is a perspective view of two opposed matched curved dies according to the invention suitable for use on a cylindrical press.

With reference now to the drawing and more particularly FIG. 1 thereof, there is shown opposed mirror-matched curved dies 11 and 12 as they would be situated upon opposed cylinders of a cylindrical press. The dies 11 and 12 are preferably made of Fiberglas in accordance with the process according to the invention described below. The specific image on the dies is capable of producing a carton blank with an embossed A on one panel suitable for containing an article, such as a tube of toothpaste or bottle of perfume.

Figure 2:
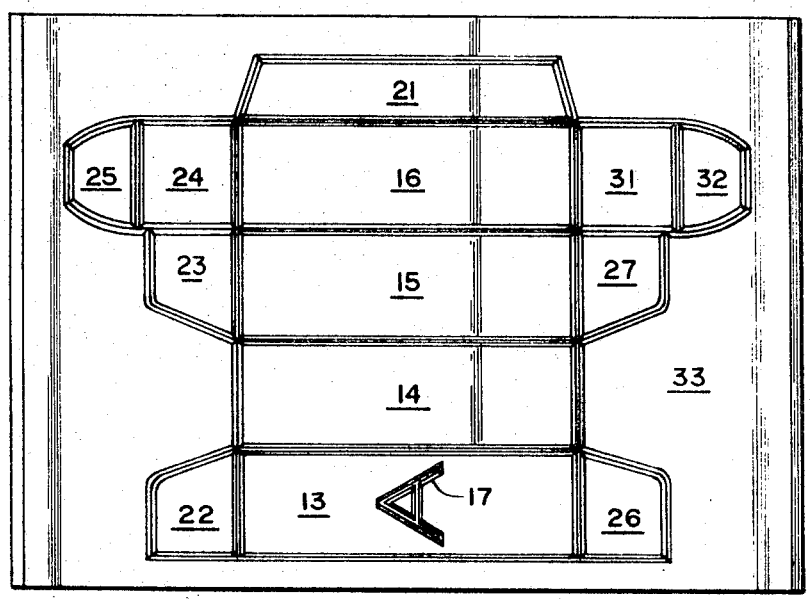
FIG. 2 is a flattened view of one of the dies of FIG. 1 showing in relief the cutting and scoring edges.

Referring to FIG. 2, there is shown the relief image embossed on lower die 12, but in flat form, corresponding essentially to the master which might be prepared through the cutting techniques briefly described above from which the mat is formed prior to being curved and serving as the mold for lower die 12. The image defines four normally vertical upright panels 13, 14, 15 and 16 of the finished carton with the A 17 being embossed on front panel 13. There is also defined a normally vertical inside flap 21, upper inside flaps 22 and 23, carton top 24, top tongue 25, lower inside flaps 26 and 27, bottom 31 and bottom tongue 32.

The entire perimeter of the image is defined by a knife edge lying in a knife edge surface, this knife edge surface being a plane parallel to and above the base 33 and being a cylindrical surface for dies 11 and 12 generally parallel to the cylindrical drum surface upon which they are adapted to be mounted in a cylindrical press. The edge between flap 23 and top 24 and between flap 27 and bottom 31 is also a knife edge. All the remaining edges are blunt edges, or scores, that are closer to the surface 33, or to the cylindrical drum surface, than the knife edges so that opposed blunt edges are sufficiently far apart when corresponding points of dies 11 and 12 are urged together along a line of closest approach so that material between opposed blunt edges is not cut through, the separation then between such opposed blunt edges being sufficiently close so as to crease the material between on both sides and permit folding in either direction without distortion.

Figure 3:
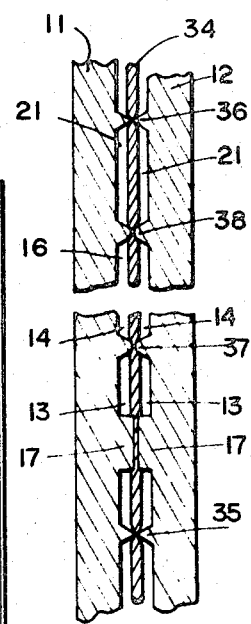
FIG. 3 is a sectional view through a portion of the matched dies of FIG. 1 in the plane perpendicular to both die surfaces and including the line of substantial contact between the opposed dies and a sheet of stock between them being cut and creased according to the invention.

Referring to FIG. 3, this feature will be better appreciated. There is shown a sectional view through dies 11 and 12 in a plane perpendicular to their opposed surfaces and including a line of contact when a piece of material, such as cardboard stock 34 is being cut, scored and embossed with the bar of the letter A. Observe that the opposed knife edge pairs 35 and 36 just barely meet (or in fact may be just short of meeting) at the midpoint of the stock 34 to fracture the stock relatively cleanly. The internal opposed pairs of blunt edges 37 and 38 are sufficiently far apart so as not to fracture material 34 while being sufficiently close together so as to crease both top and bottom and thereby permit folding in either direction without distortion.

In making the dies 11 and 12 the following procedure may be followed. First the outline shown in FIG. 2 may be photographically or otherwise transferred upon a brass plate. Then conventional cutting techniques, such as chemical etching or routing, may be employed to leave knife edges where desired and blunt edges where desired. A mat of the image in relief on this brass plate may then be made in the same manner practiced in making newspaper plates. The mat may then be curved to present a concave contour of the relief impression of the engraved flat plate essentially along a surface having a radius of curvature corresponding to that which the finished die is desired to have when affixed to the drum of a cylindrical press, this radius typically being 6.5 inches. A sheet of moldable plastic material may then be placed over the curved mat and sufficient heat and pressure applied to cause the sheet to assume the shape of the curved image in relief. The assembly may then be allowed to cool, thereby producing die 12. The process may be repeated to produce die 11, but the mirror image of the outline of FIG. 2 initially transferred to a second brass plate.

That is to say, the steps set forth in the preceding paragraph are repeated. The mirror image of the outline shown in FIG. 2 is transferred upon the second brass plate. This second brass plate is then etched or routed to bring out the mirror image in relief. A mat of this mirror image in relief is then made, curved to present a concave contour and sheet of moldable plastic material placed over the curved mat under sufficient heat and pressure to cause the sheet to assume the shape of the curved mirror image in relief. The assembly is then allowed to cool, thereby producing die 11.

Dies according to the invention are relatively easy to make and operate for a relatively large number of pressings. Even when a die wears out, an exact replacement is relatively easy to obtain. In fact, a number of dies may be made at a time so that should a die fail while embossing, replacement may be rapidly and relatively easily made to minimize shutdown during a production run. And the relatively low cost of the dies makes it feasible to have a number of presses operating simultaneously. Furthermore, while the process has been described in connection with a die of relatively simple form, the techniques of the invention are applicable to making highly complex embossings so that a single pair of dies can cut, crease and beautifully emboss stock with a single pass to facilitate production of extremely attractive containers at remarkably low cost.

The specific embodiments described herein are by way of example only. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

The embodiments of the invention in which an exclusive property or privilege is claimed are defined as follows.

I claim:

1. A method of making mirror-matched first and second curved dies which method includes the steps of,
  applying a first image of the desired end product upon a first flat plate,
  cutting said plate to form a first flat projection of said first image in relief,
  making a first master mat of said image in relief from said first flat projection,
  forming said first master mat into a first concave contour with diameter of curvature corresponding to that of said curved dies,
  bringing Fiberglas or other moldable material into contact with said first master mat under heat and pressure sufficient to establish on said moldable material the form of the first image in relief on the first master mat,
  allowing said moldable material to harden,
  and removing said first master mat to thereby provide said first die,
  applying a second image of the desired end product upon a second flat plate which second image is the mirror image of said first image,
  cutting said second flat plate to form a second flat projection of said second image in relief,
  making a second master mat of said second image in relief from said second flat projection,
  forming said second master mat into a second concave contour with said diameter of curvature,
  bringing moldable material into contact with said second master mat to establish on the latter moldable material the form of the second image in relief on the second master mat, allowing the latter moldable material to harden, and removing said second master mat to thereby provide said second die.

2. A pair of mirror-matched curved dies made in accordance with the method set forth in claim 1.

References Cited

UNITED STATES PATENTS

| | | | |
|---|---|---|---|
| 1,738,271 | 12/1929 | Andrews | 93—58.2 |
| 2,712,777 | 7/1955 | Bright | 93—58 X |
| 2,863,337 | 12/1958 | Ackley | 93—58.2 X |
| 2,865,235 | 12/1958 | Phillips | 76—107 |
| 2,885,933 | 5/1959 | Phillips | 93—58 |
| 2,993,421 | 7/1961 | Phillips | 93—58 |
| 3,000,237 | 9/1961 | Phillips | 76—107 |
| 3,108,327 | 10/1963 | Phillips | 18—36 |
| 3,410,183 | 11/1968 | Sarka. | |
| 2,390,072 | 12/1945 | Beaton | 83—51 |
| 3,283,617 | 11/1966 | Kletzker. | |
| 3,302,490 | 2/1967 | Bishop. | |
| 3,355,969 | 12/1967 | Sarka | 93—58.2 X |
| 3,383,991 | 5/1968 | Sarka | 93—58.2 |

FOREIGN PATENTS 915,789  1/1963  Great Britain.

WAYNE A. MORSE, JR., Primary Examiner

U.S. Cl. X.R.

83—51; 93—1, 58.2, 58.4